(12) United States Patent
Ilyadis

(10) Patent No.: US 9,118,591 B2
(45) Date of Patent: Aug. 25, 2015

(54) DISTRIBUTED SWITCH DOMAIN OF HETEROGENEOUS COMPONENTS

(75) Inventor: Nicholas Ilyadis, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 260 days.

(21) Appl. No.: 12/872,738

(22) Filed: Aug. 31, 2010

(65) Prior Publication Data

US 2012/0027018 A1  Feb. 2, 2012

Related U.S. Application Data

(60) Provisional application No. 61/369,529, filed on Jul. 30, 2010.

(51) Int. Cl.
| | |
|---|---|
| H04L 12/28 | (2006.01) |
| H04L 12/935 | (2013.01) |
| H04L 12/931 | (2013.01) |
| H04L 12/713 | (2013.01) |

(52) U.S. Cl.
CPC ............ *H04L 49/3009* (2013.01); *H04L 49/70* (2013.01); *H04L 45/586* (2013.01); *Y02B 60/44* (2013.01)

(58) Field of Classification Search
USPC ........................................................ 370/392
See application file for complete search history.

(56) References Cited

U.S. PATENT DOCUMENTS

| | | | |
|---|---|---|---|
| 5,550,816 A * | 8/1996 | Hardwick et al. ............ 370/397 |
| 7,653,056 B1 | 1/2010 | Dianes et al. | |
| 8,254,285 B2 | 8/2012 | Siddha et al. | |
| 2004/0088714 A1* | 5/2004 | Wang et al. .................... 719/315 |
| 2006/0031506 A1* | 2/2006 | Redgate ........................ 709/226 |
| 2006/0047850 A1 | 3/2006 | Singh et al. | |
| 2007/0079307 A1* | 4/2007 | Dhawan et al. ................... 718/1 |
| 2008/0148341 A1* | 6/2008 | Ferguson et al. ................. 726/1 |
| 2008/0313318 A1* | 12/2008 | Vermeulen et al. ........... 709/223 |
| 2009/0241113 A1* | 9/2009 | Seguin et al. ...................... 718/1 |
| 2009/0279536 A1 | 11/2009 | Unbehagen et al. | |
| 2009/0287848 A1* | 11/2009 | Kamura et al. ............... 709/246 |
| 2009/0292858 A1* | 11/2009 | Lambeth et al. .................. 711/6 |
| 2010/0023940 A1* | 1/2010 | Iwamatsu et al. ................. 718/1 |
| 2011/0019669 A1* | 1/2011 | Ma et al. ........................ 370/389 |
| 2011/0093849 A1* | 4/2011 | Chawla et al. .................... 718/1 |

FOREIGN PATENT DOCUMENTS

CN  101129032 A  2/2008

OTHER PUBLICATIONS

European Search Report for Application No. 11005997.9-2416 dated Nov. 8, 2011, (3) pages.
Office Action for related Chinese Patent Application No. 201112177676.6, mailed Oct. 18, 2013; 7 pages.

* cited by examiner

*Primary Examiner* — Omar Ghowrwal
*Assistant Examiner* — Angel Brockman
(74) *Attorney, Agent, or Firm* — Sterne, Kessler, Goldstein & Fox P.L.L.C.

(57) ABSTRACT

A method of integrating virtual and physical network switching components into a heterogeneous switching domain is provided. Such method including, attaching, by a switching device, a header to a packet received from a virtual machine, the header including domain information, and processing the packet by the switching device, the processing being controlled by the header. Finally, the packet is forwarded, the forwarding being controlled by the header.

27 Claims, 7 Drawing Sheets

700

```
A method of integrating virtual and physical network switching
devices into a heterogeneous switching domain.
                        │
                        ▼
┌─────────────────────────────────────────────────┐
│ Attach, by a first switching device, a header to a │ ─ 710
│ packet received from a virtual machine, wherein the │
│ header includes domain information about the      │
│ heterogeneous switching domain.                    │
└─────────────────────────────────────────────────┘
                        │
                        ▼
┌─────────────────────────────────────────────────┐
│ Process the packet by the first switching         │
│ device, wherein the processing is controlled by   │ ─ 720
│ the header.                                       │
└─────────────────────────────────────────────────┘
                        │
                        ▼
┌─────────────────────────────────────────────────┐
│ Forward the processed packet, wherein the         │ ─ 730
│ forwarding is controlled by the header.           │
└─────────────────────────────────────────────────┘
                        │
                        ▼
                      End
```

FIG. 7 ns the switch domain, according to an embodiment of the invention.

DISTRIBUTED SWITCH DOMAIN OF HETEROGENEOUS COMPONENTS

CROSS-REFERENCE TO RELATED APPLICATIONS

This application claims benefit to U.S. Provisional Patent Application 61/369,529, filed Jul. 30, 2010, which is incorporated herein by reference in its entirety.

FIELD OF THE INVENTION

The present invention generally relates to distributed switching, and in particular, but not exclusively to, a switch domain that unifies virtual and physical switches.

BACKGROUND OF THE INVENTION

As modern networks evolve, different types of network devices are being used to process and route packets in a complex network switching fabric. Traditionally, benefits have been achieved by linking together physical switching devices into logical entities, such linkages between network components, e.g., ports, bridges and network switches, having a direct, physical aspect. Network linkages between components have involved the integration of homogeneous collections of physical devices.

Increasingly, virtual machines (VMs) linked to virtual switches are being integrated into network topologies. Virtualized environments, managed by virtual machine managers (VMMs) are deployed in different ways, on top of different physical topologies. Problems can occur when virtual switching components interact with physical switching components. In contrast to the linkages between physical networking components, linking a physical and virtual switching device in a network can be challenging.

Challenges to implementing linkages between heterogeneous network components include the dynamic nature of the virtual switch and different types of topologies upon which a virtual switch can be deployed, e.g., virtual switches that link multiple virtual machines, complex and dynamically changing network topologies, and the maintenance of performance, energy savings and efficiency standards.

Those with skill in the relevant art(s) realize that, with respect to the management of a large number of heterogeneous devices, both the challenges and benefits can be significant. Thus, what is needed is improved methods and systems for overcoming the shortcomings described above.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 7 shows a flowchart illustrating a method of integrating virtual and physical network switching components into a switching domain, according to an embodiment of the invention.

The invention is described with reference to the accompanying drawings. The drawing in which an element first appears is typically indicated by the leftmost digit(s) in the corresponding reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

OVERVIEW

Generally speaking, some embodiments described herein relate to enabling a distributed switching domain that includes heterogeneous network switching/routing components. Traditional approaches to improving the performance of network switching have focused on logically linking physical switching devices.

Traditional approaches however, do not create a switching domain that encompasses the full variety of physical and virtual switching resources. Some embodiments described herein describe methods and systems for creating a switching domain that advantageously encompasses virtual switches and physical switches. As is described below, other types of heterogeneous resources can also be advantageously linked using the teachings herein.

Traditional approaches also do not create a switching domain that integrates network interface card (NIC) resources and virtual switches in a switching domain. Some embodiments described herein integrate a NIC resource—a switching accelerator engine—with a virtual switch in a heterogeneous switching domain. As is described below, other types of NIC resources and virtual components can also be advantageously linked using the teachings herein.

Figure 1:
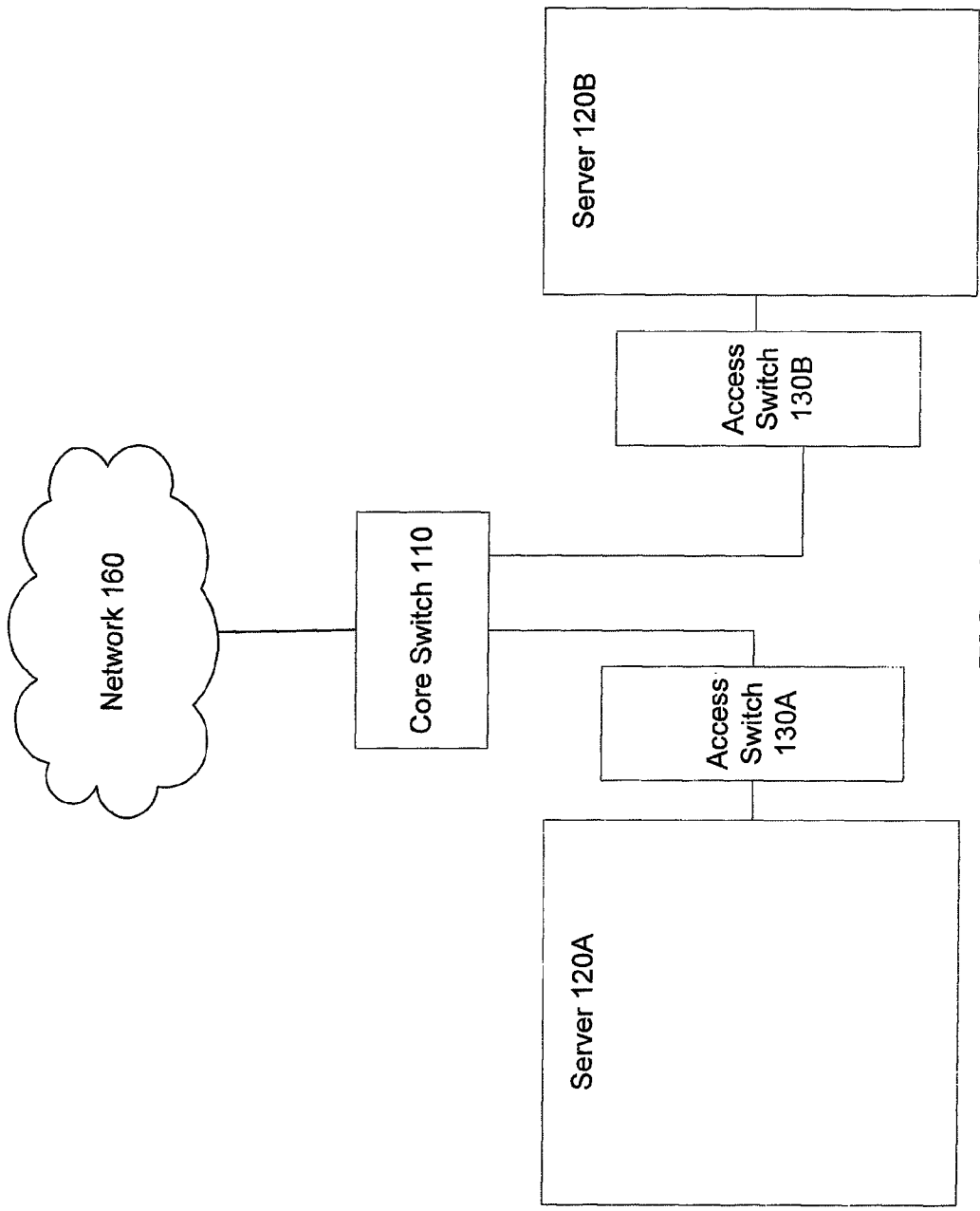
FIG. 1 is a block diagram of an example network topology.

FIG. 1 depicts a sample network topology 100 including servers 120A-B, access switches 130A-B, network 160 and core switch 110, according to an embodiment. Physical links are shown between server 120A-B and access switches 130A-B respectively, and between core switch 110, network 160 and both switches 130A-B. In an embodiment, the relationship between core switch 110 and access switches 130A-B can be termed a hierarchical relationship, with core switch 110 being superior.

In a non-limiting example, network topology 100 is a subset of a data center network, and servers 120A-B are configured to host applications and data for clients connected to network 160 (not shown). As would be appreciated by one having ordinary skill in the relevant art(s), teachings herein can apply to a variety of different network configurations and purposes.

Server devices 120A-B are typically computer systems that can have multiple processors and multiple shared or separate memory components such as, for example and without limitation, one or more computing devices incorporated in a clustered computing environment or server farm. The computing processes performed by the clustered computing environment or server farm, may be carried out across multiple processors located at the same or different locations. In another embodiment, server devices 120A-B can be implemented on a single computing device. Examples of computing devices include, but are not limited to, a device with a central processing unit, an application-specific integrated circuit, or other type of computing device having at least one processor and memory.

Network 160 can be any network or combination of networks, for example and without limitation, a local-area network, wide-area network, internet, a wired connection (e.g., Ethernet) or a wireless connection (e.g., Wi-Fi, 3G) network that communicatively couples the networking components of FIG. 1 (core switch 110, access switches 130A-B, servers 120A-B) to other networking components.

Access switches 130A-B are typically networking bridge devices with data ports that can additionally have routing/switching capability, e.g., L2/L3 switch/router. The switch could have as little as two data ports or as many as 400 or more data ports, and can direct traffic in full duplex from any port to any other port, effectively making any port act as an input and any port as an output. Herein, data ports and their corresponding links can be interchangeably referred to as data channels, communication links, data links, etc, for ease of discussion.

Because the physical depictions in the figures should not be interpreted as limiting, access switches 130A-B and hosts 120A-B, as used herein can include host 120A and access switch 130A combined in a single physical device (not shown). Access switches 130A-B also broadly include the use of switch logic in modern tiered switching architectures. Core switch 110 is typically a high speed switch that is placed in a network topology so as to link multiple access switches 130. The term "physical," as used herein to describe network components, typically means "non-virtual," as in a non-virtualized device. Also, because the teachings herein as applied to traffic path selection and processing can be generally applied to all components that handle these functions, as used herein, the terms routing, switching and routing/switching are generally used interchangeably.

Figure 2:
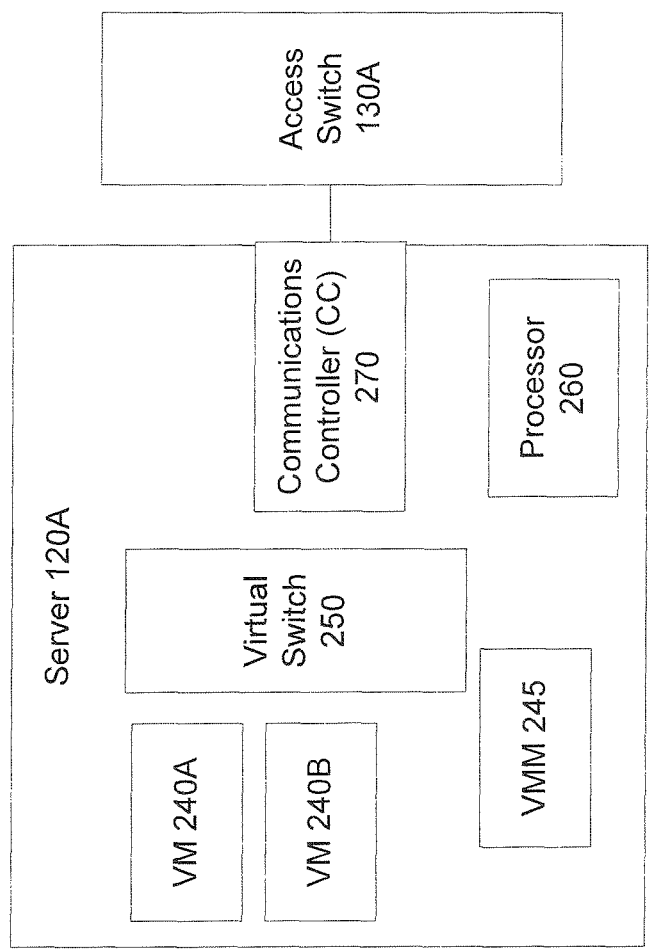
FIG. 2 is a more detailed block diagram of a server coupled to a switch, the server including virtualized components, according to an embodiment of the present invention.

FIG. 2 depicts an example of server 120A and access switch 130A. Server 120A is depicted as including virtual machines 240A-B, virtual switch 250, communication controller (CC) 270, virtual machine manager (VMM) 245 and processor 260. Physical links are shown between server 120A and access switch 130A.

Virtual machines (VMs) 240A-B are typically dynamically provisioned software entities that appear to the network as independent network entities, each having a media access control (MAC) address. VMs 240A-B are also typically an instance of a virtual machine as a part of a virtualization platform. One having skill in the relevant art(s) will know of modern virtualization platforms and their implementation. A system having a virtual machine typically provides a complete system platform, which supports the execution of a complete operating system (OS). Virtual machines are typically managed by virtual machine managers (also known as hypervisors), such as VMM 245.

Virtual switch (VS) 250 is typically used to provide communication between the VMs 240A-B and other network components. In an example operation, VS 250 receives a packet from VM 240A, reads the source MAC address and destination MAC address and forwards the packet within the server's memory subsystems. With this forwarding operation, VS 250 is allowing VM 240A to communicate with external devices, as well as other virtual machines in server 120A.

One having skill in the relevant art will appreciate that in some implementations, the virtual control plane (e.g., VMM 245) of a virtualized system can be unaware of different aspects of the physical portions of the network topology. This lack of information in VMM 245 is especially important with respect to linkages between physical and virtual switching components. As discussed below, some embodiments can provide additional information to virtualized components, improving in linkages between heterogeneous components in the network.

Processor 260 is typically a single processor, a plurality of processors, or combinations thereof. Processor devices may have one or more processor 'cores.' For instance, at least one processor device and a memory may be used to implement the above described embodiments.

After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Figure 3:
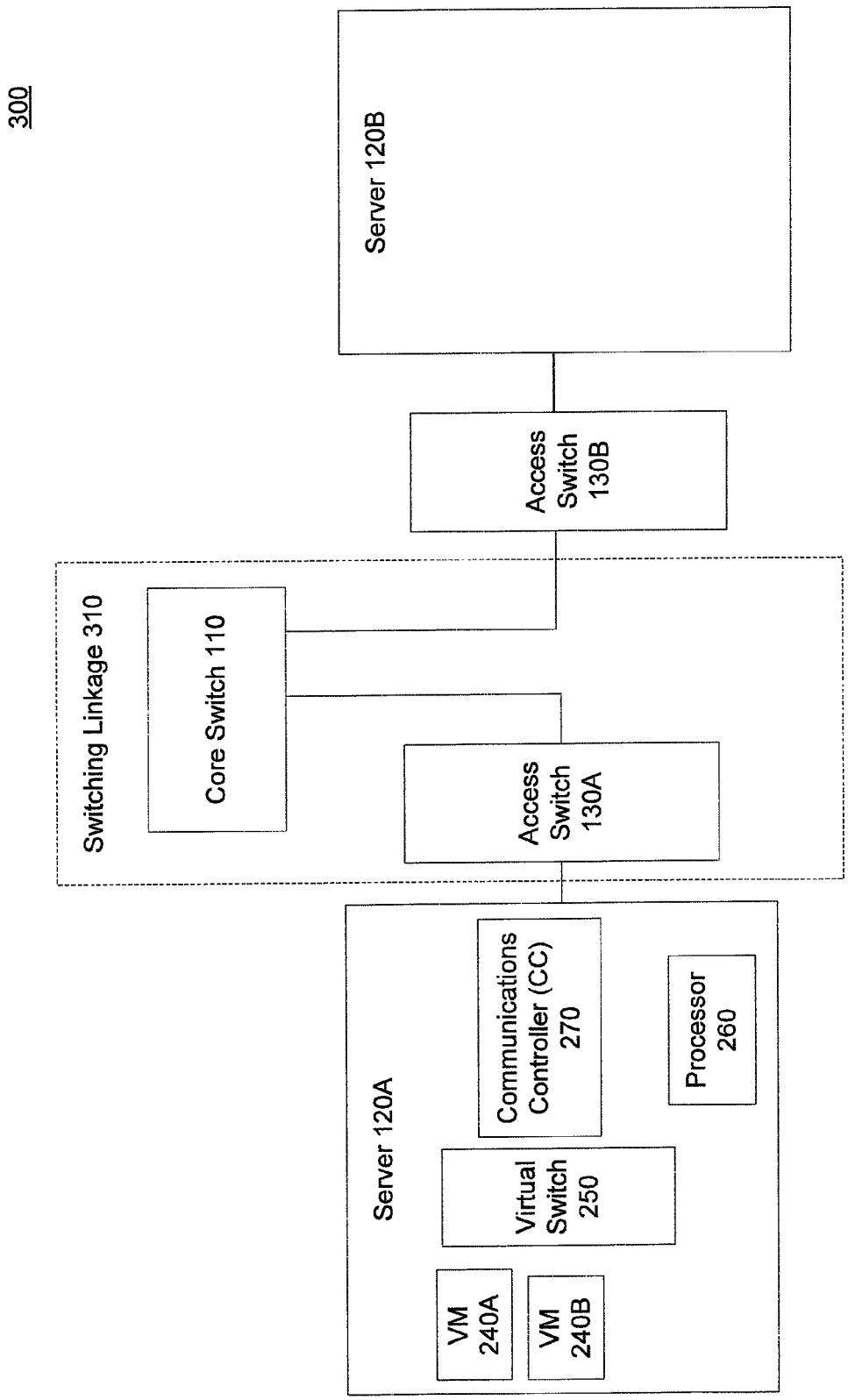
FIG. 3 is a block diagram of a system having a linkage between physical switching components and a server having virtualized components, according to an embodiment of the present invention.

FIG. 3 depicts a network topology 300 that is similar to network topology 100 from FIG. 1, including a dotted line representing traditional switching linkage 310. Switching linkage 310 is depicted as containing core switch 110 and access switch 130A. It should be noted that communication controller 270 and virtual switch 250 are not included in switching linkage 310.

As discussed above, traditionally, different approaches to linking physical components into switching linkage 310 have been pursued. For example, network traffic has been "tagged" with basic informational headers. These tags are designed to logically link, or "stack" the physical switches by providing reference information, e.g., packet source and destination information that enable the packet to be routed through switching linkage 310. As noted above, the traditional tags that enable these physical linkages between physical devices do not have the detail required to link heterogeneous network devices, such as virtual and physical switches. Alternative approaches used in embodiments are discussed below.

Heterogeneous Switching Domain

Figure 4:
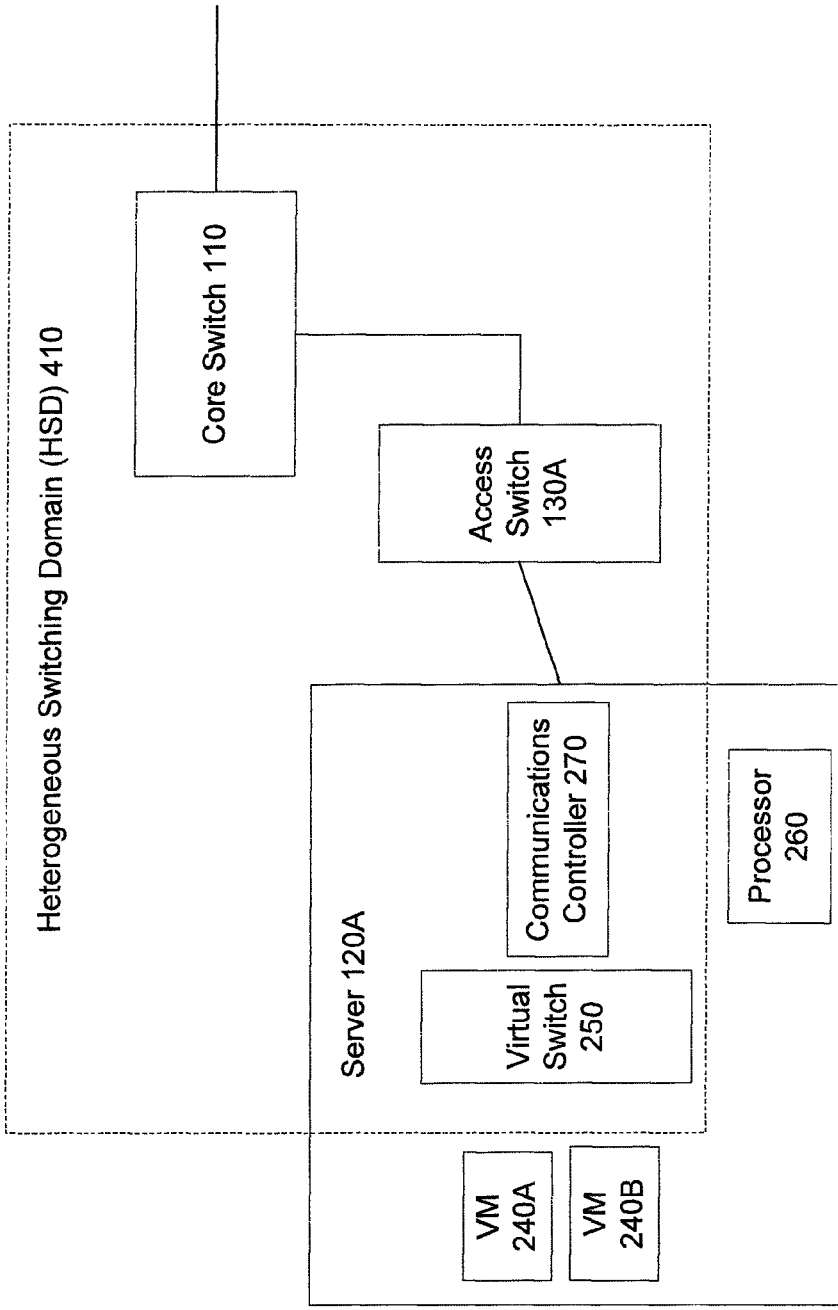
FIG. 4 is a block diagram of a system having a heterogeneous switching domain, according to an embodiment of the present invention.

FIG. 4 depicts network topology 400 as having a heterogeneous switching domain (HSD) 410, including virtual switch (VS) 250, access switch 130A and core switch 110, according to an embodiment.

As used in some embodiments herein, HSD 410 can link/integrate/bind virtual and physical switching devices into a single switching domain. For example, in an embodiment, HSD 410 enables access switch 130A and VS 250 to have similar attribute filters, QOS and traffic management characteristics. One having skill in the relevant art(s) with access to the teachings herein, will appreciate the benefits accruing from this integration of virtual and physical switch characteristics/attributes, example benefits being discussed below.

From the network perspective, when a packet enters an "edge" switch port of HSD 410, the packet is treated like it is being processed by a single switching engine as it moves through HSD 410 components. Termed differently, in an embodiment, HSD 410 advantageously acts as an extender of the switch fabric between all of the included components.

One having skill in the relevant art, with access to the teachings herein will also understand that this linkage of heterogeneous linking devices into a single domain contrasts with the traditional "stacking" discussed above with FIG. 3.

Enhanced Headers

One approach to enabling HSD 410 to link virtual and physical network components is to use an enhanced header prepended to processed packets as they interact with switches within HSD 410. In contrast to the limited traditional tags described above, enhanced headers contain additional information relevant to enabling the noted features of HSD 410 described in embodiments herein. In an embodiment, the enhanced headers can contain and distribute updated state-information about components of network topology 400. In an embodiment, the information about the operation of HSD 410 stored and relayed via the enhanced header can be termed "domain information."

While traditional tagging of packets in homogeneous networks can include references to different points in the network, e.g., sources and destinations, some embodiments of the enhanced header described herein include commands impacting different networking considerations, e.g., performance, energy savings, efficiency.

List H1-H8 below is a non-limiting illustrative list of example relevant items that can be included in an enhanced header, according to embodiments:

H1. A command to specify an ingress port of a packet into a network switching component.

H2. A command to specify an egress port of a packet out of a network switching component.

H3. A command to specify additional processing to be performed on a packet before forwarding by a network switching component.

H4. A command to specify conditions that must be satisfied before a packet is forwarded by the network switching component. For example, before a packet is forwarded out of HSD 410, a condition can be set whereby permission must be granted to exit a specified egress port on a specified network switching component.

H5. A command to specify packet filtering options. For example, packets may be filtered based on their origin or destination subdomains.

H6. A command to specify options and conditions for packet processing. In an embodiment, because VS 250 is implemented using processor 260, benefits can accrue from implementing packet processing options/conditions tailored to the capabilities and workload of processor 260. In an embodiment, because of the heterogeneous integration of HSD 410 (virtual linked to physical), processing functions can be dynamically reassigned between virtual and physical resources.

H7. A command to specify forwarding options, such options specifying traffic paths within the network. In an embodiment, each traffic path can have different weights, capabilities, levels of congestion, and these characteristics can be used to provide source-based direction of the packet. As would be appreciated by one having skill in the relevant art(s) given the description herein, this capability, in embodiments, can be especially useful for routing packets in to, and out of, virtual switches. Virtual switches, as with all components in the virtual plane, traditionally do not have comprehensive information about physical characteristics outside the plane. In an embodiment, linking the virtual and physical switches into HSD 410 can improve the routing capabilities of VS 250 by providing information about components inside HSD 410. This improvement in routing can, for example improve load-balancing capabilities on the network generally.

H8. A command to specify energy control and efficiency policies to be applied to different integrated components within HSD 410. As with the physical characteristics discussed with H7 above, traditionally in network implementations with virtual components, the implementation of comprehensive power-savings options has been difficult. In an embodiment, by integrating the physical and virtual switches in HSD 410, a unified approach can be taken to implementing energy control and efficiency approaches. Such approaches can include, for example, control policies implemented with the IEEE P802.3az standard, also known as Energy Efficient Ethernet.

As would be appreciated by one having skill in the relevant art(s), items H1-H8 above are non-limiting examples of information that can relayed in an enhanced header. HSD 410 and the functions/benefits attributed thereto, can be implemented in a variety of ways, without departing from the spirit of the invention disclosed herein.

One example of an enhanced header is the HIGIG HEADER from Broadcom Corporation of Irvine, Calif. One type of HiGig header interface is a 10-Gbps, full-duplex chip-to-chip interface that can enhance system scalability and performance. Certain implementations and customizations of the HiGig header (along with variations HiGig+ and HiGig2 Protocols) can be used by embodiments to provide a standard mechanism for interconnecting physical and virtual switches into a heterogeneous switch domain, such as HSD 410. Embodiments of the protocol can define forward Frames for Unicast, Broadcast, Multicast (Layer 2 and IP) and Control Traffic. The HiGig/HiGig+ Protocol implements HiGig Frames, which are formed by prepending to standard Ethernet frames, a 12-Byte to 16-Byte HiGig header. It should be appreciated that this specific header is an example, and only one type of protocol that can implement some embodiments described herein.

In some implementations, the HiGig header contains information about the packet, its source and destination ports, and port mirroring. In embodiments, this information can hasten table lookups within and between switch domains, thus improving overall system performance.

Switching Accelerator Engine (SAE)

Figure 5:
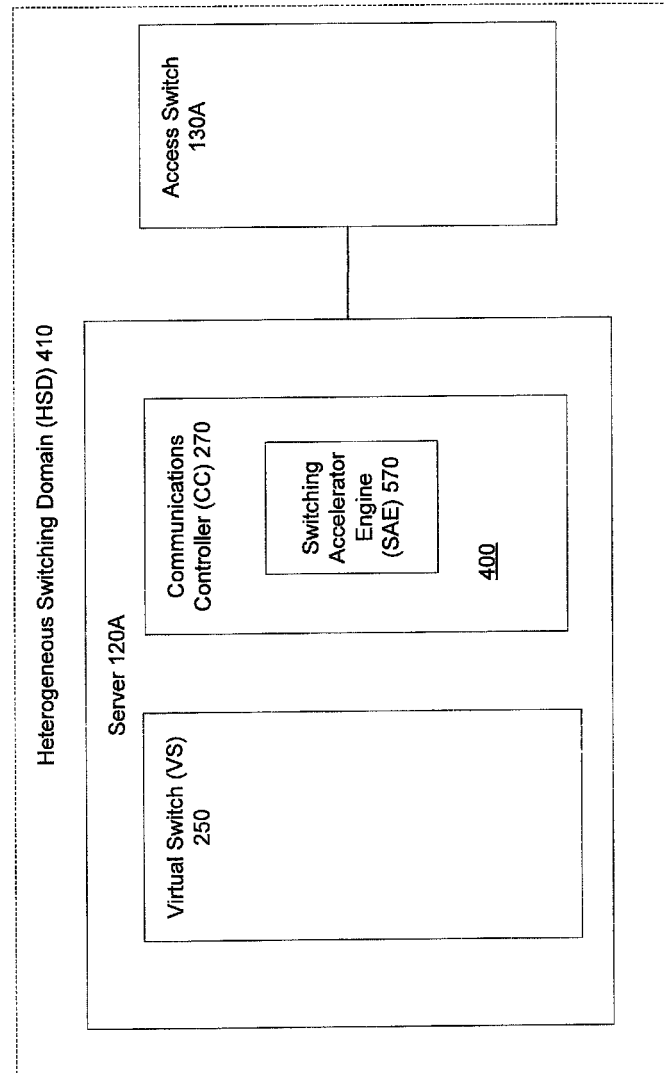
FIG. 5 is a block diagram showing a communications controller having a switching accelerator engine, according to an embodiment of the present invention.

FIG. 5 depicts embodiments of server 120A and access switch 130A, server 120A depicted as having virtual switch 250, communications controller (CC) 270. CC 270 is depicted as having SAE 270. As noted above, in addition to linking VS 250 and physical switches (130A, 110), embodiments of HSD 410 can incorporate communications controller (CC) 270. Specifically, in an embodiment using HSD 410, switching accelerator engine (SAE) 570 can be linked to VS 250 and switches 130A, 110.

Communications controller (CC) 270, in an embodiment has within it a switching accelerator engine (SAE) 570 (also known, as a NIC Switching Engine"). By including switching accelerator engine (SAE) 570 in communications controller 270 on server 120A, additional processing resources can be made available to HSD 410. SAE 570, can be a specialized processor designed to perforin switching functions for physical and virtual components within HSD 410.

In an example, VS 250 can selectively offload processing functions to SAE 570 if circumstances warrant. The inclusion of SAE 570, as a different type of hardware component integrated into HSD 410, emphasizes the heterogeneous nature of the HSD 410 structure.

In an example, VS 250 can use the switching capability of the SAE 570 to accelerate the switching/processing/forwarding capabilities of VS 250. In this embodiment, by using SAE 570, communications controller 270 becomes an additional hardware acceleration engine for VS 250. The virtual switching functions improved by SAE 570 include the efficient processing of the enhanced headers described herein.

Benefits

The integration described above, provided by HSD 410 has many benefits. Items B1-B10 below are a non-limiting list of example benefits that can accrue from embodiments, as well as additional implementation specifics:

B1. By integrating physical and virtual switches into a single switching entity, embodiments reduce the amount of devices—virtual and physical—on the network have to be individually managed. In an embodiment, fewer devices also are required to participate in topology protocols used in packet processing.

B2. Having a unified approach to traffic within HSD 410 improves the monitoring of switch traffic. VS 250, for example, can co-ordinate packet monitoring with access switch 130A. In an embodiment VS 250 can copy packets and send to a monitoring port on a different switch entity, e.g., on switch 130A. Because the enhanced headers described above can contain information about the characteristics and traffic of all of the integrated components in HSD 410, this can provide a more efficient method of monitoring traffic.

B4. The integration of VS 250 with access switch 130A allows approaches to be developed to improve the efficiency and operation of the virtual switching process. As would be appreciated by one skilled in the relevant art(s), given the description herein, virtual switches can benefit from having additional processing power applied to switching tasks. Because of the integration of VS 250 and access switch 130A, in embodiments, selected processing tasks can be dynamically offloaded from VS 250 to access switch 130A. As noted above, this offloading can also be performed by SAE 570. In embodiments, the resources in integrated network components can be enabled to self balance, e.g., automatically performing function where it is best suited based on the operation of the system.

B6. In embodiments, by linking network components in HSD 410, security aspects of system 400 can be improved. In an embodiment, the "edge" of HSD 410 can be configured apply security procedures. For example, the ports of outward facing components (e.g., VS 250) can be set to have additional conditions applied before packets are allowed access to specified ingress ports. In an embodiment, one method of enforcing these security policies around the edges of HSD 410 is to use the enhanced headers described above.

B7. The same distribution of security policies discussed with B6 above, can be used, in embodiments, to distribute and apply energy conservation and control policies to different components. For example, as would be appreciated by one having skill in the relevant art(s), if VS 250 is using two redundant traffic paths at 50% utilization, detecting this condition and moving one of the links to 0% usage and the other to 100%, can save energy in certain circumstances. In an embodiment, linking VS 250 with other resources in HSD 410 can both help detect the condition and enforce policies to correct it.

Implementations with Different Hardware Vendors

Because some embodiments of HSD 410 described herein are designed to integrate the switching logic of virtual and physical switching entities, in an embodiment, a Software Development Kit (SDK) is provided that allows virtual switches without integration capabilities to be integrated into HSD 410 entities described herein.

For example, if a particular "vanilla/generic" virtual switch implementation does not have the features/capabilities that enable its integration into HSD 410, the SDK allows the features to be added. One feature that could be added is the capability to work with the enhanced headers described above, these headers providing, in an embodiment, the coordinating linkage between the virtual and physical switches. Such SDK, or similar switch drivers, can turn the vanilla virtual switch into a specialized virtual switch capable of accruing the benefits of embodiments described herein.

As noted above, in an embodiment, having virtual switch 250 integrated into HSD 410 allows this switch have different policies, characteristics and attributes applied to its switching functions. As would be appreciated by one having skill in the relevant art(s), with access to the teachings herein, different network switching components (e.g., communication controllers, switches) from different vendors can have different characteristics, and it is advantageous to have these characteristics easily and uniformly applied by embodiments to virtual switches in HSD 410.

For example, having the vendor-specific characteristics of access switch 130A applied to VS 250, can enable VS 250 to have improvements with respect to an integration between these components.

Figure 6:
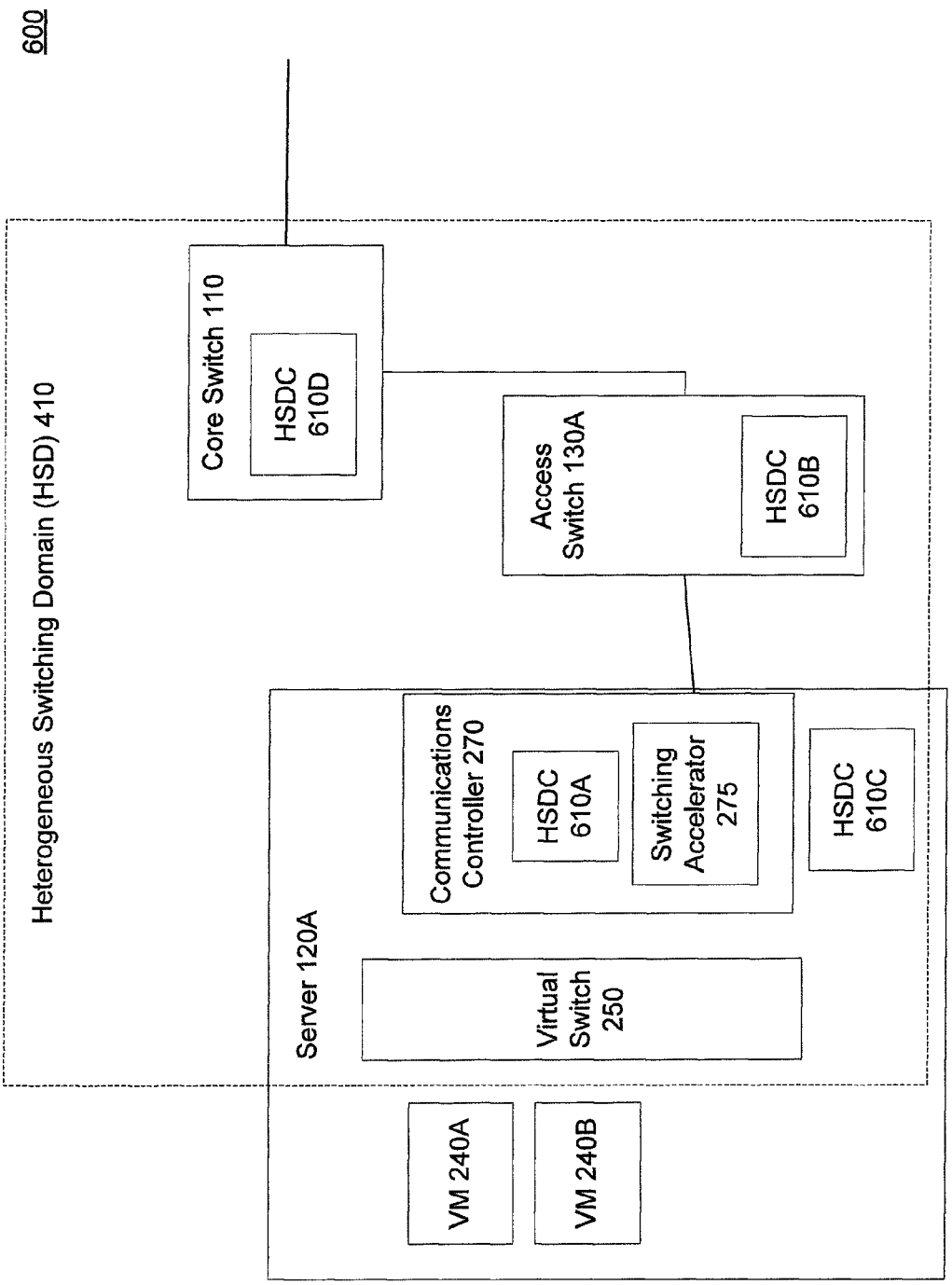
FIG. 6 illustrates different placements of a heterogeneous switching domain controller, according to an embodiment of the present invention.

FIG. 6 depicts network topology 600 showing embodiments of a heterogeneous switching domain controller (HSDC) 610A-D. In different embodiments HSDC 610A-D provides centralized logic to apply the HSD 410 functions described above. For example, HSDC 610A-D can coordinate the enforcement of security policies across the heterogeneous components included within the domain. As would be appreciated by one having skill in the relevant art(s), given the description herein, HSDC 610A-D can perform its controller function by managing the creation, modification, and application of the above-noted enhanced headers used by HSD 410 components.

The logic and controller function described with the embodiment of HSDC 610A-D above can be located in one or more components of network topology 600. Example placements depicted include: HSDC 610A as a part of communications controller 270, HSDC 610B as a part of access switch 130A, HSDC 610C as a part of server 120A and HSDC 610D as a part of core switch 110. The noted placements are intended to be non-limiting, with embodiments of HSDC 610A-D being implemented as hardware or software.

Method 700

This section and FIG. 7 summarize the techniques described herein by presenting a flowchart of an exemplary method 700 of integrating virtual and physical network switching devices into a heterogeneous switching domain. While method 700 is described with respect to an embodiment of the present invention, method 700 is not meant to be limiting and may be used in other applications.

As shown in FIG. 7, an embodiment of method 700 begins at step 710 where a header is attached to a packet received from a virtual machine, by a first switching device, the header including domain information about the heterogeneous switching domain. In an embodiment, VS 250 can attach a header to a packet received from VM 240A. Once step 710 is complete, method 700 proceeds to step 720.

At step 720, the packet is processed by the first switching device, the processing being controlled by the header. In an embodiment, the packet is processed by VS 250, such processing controlled by the header. Once step 720 is complete, method 700 proceeds to step 730.

At step 730, the packet is forwarded, the forwarding being controlled by the header. In an embodiment, VS 250 forwards the packet to either access switch 130A or SAE 570. Once step 730 is complete, method 700 ends.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method of integrating virtual and physical network switching devices into a heterogeneous switching domain having both a virtual switching device and a physical switching device, the method comprising:
   receiving, at the virtual switching device, information associated with the physical switching device;
   generating, by the virtual switching device, an enhanced header that includes information associated with dynamic assigning of processing functions among the virtual and physical network switching devices, the generating being based on the received information, wherein the enhanced header includes commands associated with networking operation, said networking operation including network performance, network energy savings, or network efficiency;
   attaching, by the virtual switching device, the enhanced header to a packet to be processed; and
   forwarding the packet for processing to a device associated with the heterogeneous switching domain.

2. The method of claim 1, wherein the processed packet is forwarded to the physical switching device.

3. The method of claim 2, wherein the physical switching device is either a switch or a router.

4. The method of claim 1, wherein the information in the enhanced header includes a command that specifies:
   an ingress port of the physical switching device; and
   an egress port of the physical switching device.

5. The method of claim 1, wherein the information in the enhanced header includes a command that specifies processing to be applied to the packet by the physical switching device.

6. The method of claim 1, wherein the information in the enhanced header includes a command that specifies filtering options to be applied to the packet by the physical switching device.

7. The method of claim 1, wherein the information in the enhanced header includes a command that specifies a traffic path to be applied to the processed packet by the physical switching device and an additional switching device.

8. The method of claim 1, wherein the information in the enhanced header includes a command that specifies an energy control and efficiency policy to be applied to the operation of the physical switching device.

9. A system of integrated virtual and physical networking components in a heterogeneous switching domain having both a virtual switching device and a physical switching device, the system comprising:
   a communications controller having a switching accelerator engine (SAE), wherein the SAE includes a processor that is configured to:
      decode an enhanced header of a packet received from the virtual switching device, wherein the enhanced header includes information associated with dynamic assigning of processing functions among the virtual and physical network switching devices, and wherein the enhanced header includes commands associated with networking operation, said networking operation including network performance, network energy savings, or network efficiency; and
      forward the packet for processing to a networking component associated with the heterogeneous switching domain.

10. The system of claim 9, wherein the networking component to which the packet is forwarded is the physical switching device.

11. The system of claim 9, wherein the networking component to which the packet is forwarded is the virtual switching device.

12. The system of claim 9, wherein the information in the enhanced header includes a command that specifies:
   an ingress port of the physical switching device in the heterogeneous switching domain; and
   an egress port of the physical switching device.

13. The system of claim 9, wherein the information in the enhanced header includes a command that specifies processing to be applied to the packet by the physical switching device.

14. The system of claim 9, wherein the information in the enhanced header includes a command that specifies filtering options to be applied to the packet by the physical switching device.

15. The system of claim 9, wherein the information in the enhanced header includes a command that specifies a traffic path to be applied to the processed packet by the physical switching device, such traffic path routing the processed packet through both the physical switching device and an additional switching device.

16. The system of claim 9, wherein the information in the enhanced header includes a command that specifies an energy control and efficiency policy to be applied to the operation of a network component.

17. A system of integrated virtual and physical networking components in a heterogeneous switching domain, the system comprising:

a server, comprising a processor;
a physical switching device;
a first virtual machine running on the server; and
a virtual switch running on the server, the virtual switch configured to receive and process a plurality of packets from the first virtual machine, wherein
upon receipt of a packet, from among the plurality of packets, from the first virtual machine, the virtual switch is configured to:
attach an enhanced header to the packet, the enhanced header containing information associated with dynamic assigning of processing functions among the virtual and physical network components, wherein the enhanced header includes commands associated with networking operation, said networking operation including network performance, network energy savings, or network efficiency, and
forward the packet for processing to a network component associated with the heterogeneous switching domain.

18. The system of claim 17, further comprising:
a communications controller installed in the server; and
a switching accelerator engine (SAE) in the communications controller, wherein the SAE is configured to receive and process the packet.

19. The system of claim 18, wherein the SAE is configured to process packets according to a command in the enhanced header attached to the packet.

20. The system of claim 17, wherein based on a consideration, the virtual switch is configured to offload a portion of packet processing to the SAE.

21. The system of claim 20, wherein the consideration is improving system performance.

22. The system of claim 20, wherein the consideration is improving system energy efficiency.

23. The system of claim 17, further comprising:
a second virtual machine, wherein the virtual switch is further configured to switch processing of at least a portion of the plurality of packets from the first virtual machine to the second virtual machine.

24. The system of claim 17, further comprising:
a second virtual machine, wherein the virtual switch is further configured to switch processing of at least a portion of the plurality of packets from the first virtual machine to the second virtual machine, bypassing the physical switching device.

25. The method of claim 1, wherein the virtual switching device is separate from the physical switching device.

26. The system of claim 9, wherein the virtual switching device is separate from the physical switching device.

27. The system of claim 17, wherein the virtual switch is separate from the physical switching device.

* * * * *